(12) United States Patent
Hatton et al.

(10) Patent No.: US 8,346,739 B1
(45) Date of Patent: Jan. 1, 2013

(54) SEGMENTING DOCUMENTS AMONG MULTIPLE DATA REPOSITORIES

(75) Inventors: Kash Hatton, Dallas, TX (US); Lance P. King, Orem, UT (US)

(73) Assignee: Affiliated Computer Services, Inc., Dallas, TX (US)

( * ) Notice: Subject to any disclaimer, the term of this patent is extended or adjusted under 35 U.S.C. 154(b) by 1845 days.

(21) Appl. No.: 10/928,632

(22) Filed: Aug. 27, 2004

(51) Int. Cl.
*G06F 7/00* (2006.01)
*G06F 12/00* (2006.01)
*G06F 17/00* (2006.01)

(52) U.S. Cl. .......................... 707/694; 707/830; 707/831

(58) Field of Classification Search ........................ None
See application file for complete search history.

(56) References Cited

U.S. PATENT DOCUMENTS

| | | | | |
|---|---|---|---|---|
| 5,592,638 A * | 1/1997 | Onodera | ........................... | 711/6 |
| 5,895,461 A | 4/1999 | De La Huerga et al. | .......... | 707/1 |
| 5,924,096 A | 7/1999 | Draper et al. | ................... | 707/10 |
| 6,021,202 A * | 2/2000 | Anderson et al. | ............... | 705/54 |
| 6,704,753 B1 * | 3/2004 | Groetzner et al. | ............ | 707/204 |
| 6,804,664 B1 | 10/2004 | Hartman et al. | ................... | 707/3 |
| 6,931,440 B1 * | 8/2005 | Blumenau et al. | ............ | 709/220 |
| 7,752,206 B2 * | 7/2010 | Akelbein et al. | ............... | 707/736 |
| 7,849,105 B2 * | 12/2010 | Prager et al. | ................... | 707/802 |
| 2001/0047381 A1 * | 11/2001 | Meno et al. | ................... | 709/101 |
| 2002/0111960 A1 * | 8/2002 | Irons et al. | .................... | 707/204 |
| 2002/0123999 A1 * | 9/2002 | Bankert et al. | .................. | 707/10 |
| 2004/0093323 A1 * | 5/2004 | Bluhm et al. | ................... | 707/3 |
| 2005/0050468 A1 * | 3/2005 | Cheng et al. | .................. | 715/530 |
| 2005/0138026 A1 * | 6/2005 | Liu et al. | ........................... | 707/5 |
| 2005/0278639 A1 * | 12/2005 | Becker | .......................... | 715/741 |
| 2006/0059173 A1 * | 3/2006 | Hirsch et al. | ................... | 707/100 |
| 2006/0294122 A1 * | 12/2006 | Altman | ......................... | 707/100 |

* cited by examiner

*Primary Examiner* — Michael Hicks
(74) *Attorney, Agent, or Firm* — Fish & Richardson P.C.

(57) ABSTRACT

Techniques for storing electronic documents include defining multiple logical storage locations, with each logical storage location corresponding to a respective first set of data parameters, and storing electronic documents in the logical storage locations. Each electronic document is stored in a logical storage location having a particular corresponding first set of data parameters. The particular corresponding first set of data parameters is associated with the electronic document, and the electronic document is indexed within the logical storage location based on a second set of data parameters.

26 Claims, 4 Drawing Sheets

SEGMENTING DOCUMENTS AMONG MULTIPLE DATA REPOSITORIES

TECHNICAL FIELD

This description relates to data storage, and more particularly to segmenting electronic documents in a large-scale storage system for storage in one of multiple data repositories.

BACKGROUND

Enterprises that perform image storage services and that use imaging of documents to perform document processing services typically are required to store enormous quantities of data. For example, large-scale document processing and/or image storage operations may handle and store millions of documents, such as checks, insurance claims, invoices, and other types of documents, in a single day. Large amounts of processing and memory resources are required to support such storage capabilities. For example, data may be stored in multiple different servers, hard drives, tapes, DVDs, magneto-optical disks, and/or other storage media. The various storage media can be distributed among different locations in a network and in diverse geographical locations. Searching for and retrieving documents in this type of system can be time consuming and can require significant processing resources.

SUMMARY

Techniques are described for storing document data according to distribution plans that segment document data among multiple different logical storage locations according to predetermined criteria. The techniques provide an efficient way to manage the storage of large amounts of document data and to store similar and/or related documents in the same logical storage location. The criteria can be mutually exclusive such that each document matches only one distribution plan. Furthermore, the segmentation of document data allows searches to be performed on only part of the overall storage system by identifying intersections of the search criteria with the document data for each of the various logical storage locations.

In one general aspect, electronic documents are stored by defining multiple logical storage locations. Each logical storage location corresponds to a respective first set of data parameters. Electronic documents are stored in the logical storage locations. Each electronic document is stored in a logical storage location having a particular corresponding first set of data parameters. The particular corresponding first set of data parameters are associated with the electronic document, and the electronic document is indexed within the logical storage location based on a second set of data parameters.

Implementations can include one or more of the following features. Each logical storage location stores electronic documents of one or more document types, and each document type for the logical storage location has a respective third set of data parameters that includes the particular corresponding first set of data parameters. A search request including one or more search parameters is received, document types having third sets of data parameters that intersect the one or more search parameters are identified, and a search based on the received search request is limited to one or more logical storage locations storing electronic documents of the identified document types. The first set of data parameters or the second set of data parameters is selected based on knowledge of parameters likely to be used to search for electronic documents having a particular document type. The electronic documents are segmented into logical groupings using distribution plans that each correspond to the first set of data parameters for a particular logical storage location.

For each electronic document, a search plan having criteria that match data field parameters associated with the electronic document is identified, and a distribution plan for the identified search plan is also identified. The identified distribution plan includes criteria that match data content parameters associated with the electronic document. Each pair of a search plan and a distribution plan is mutually exclusive with respect to other pairs of search plans and distribution plans. The first set of data parameters corresponding to each logical storage location is mutually exclusive with respect to the first set of data parameters for others of the plurality of logical storage locations. Each electronic document includes a set of index data and a set of attachments. The set of index data and the set of attachments are stored in different logical storage locations for each electronic document.

The first set of data parameters and the second set of data parameters can be the same and can include parameters such as data fields, data types, and/or data content. The first set of data parameters and the second set of data parameters can also be different and can each include parameters such as data fields, data types, and/or data content. The logical storage locations correspond to physical storage locations. Each logical storage location corresponds to a directory in a computer storage system.

In another general aspect, an electronic document to be stored is received and a selected logical storage location for storing the electronic document is identified. The selected logical storage location is selected from among multiple logical storage locations, each of which has a corresponding set of parameters. The set of parameters for the selected logical storage location matches parameters defined in the electronic document. The electronic document is stored in the selected logical storage location.

Implementations can include one or more of the following features. The electronic document includes indexing data and one or more attachments, and identifying a selected logical storage location involves identifying a first selected logical storage location for the indexing data and identifying a second selected logical storage location for the one or more attachments. Storing the electronic document involves storing the indexing data in the first selected logical storage location and storing the one or more attachments in the second selected logical storage location. A search request identifying one or more search parameters is received, and document types having sets of parameters that include the one or more search parameters are identified. A search performed in response to the received search request is limited to logical storage locations that store the identified document types. A distribution plan that matches data field parameters defined in the electronic document is identified, and the identified distribution plan and data content parameters defined in the electronic document are used to identify the selected logical storage location.

In another general aspect, a document storage system includes multiple data repositories and a server operable to store electronic documents in the data repositories. The server is further operable to identify one of the data repositories for storing each electronic document. Each data repository has a corresponding set of parameters, and the set of parameters for the identified data repository match parameters defined in the electronic document.

Implementations can include one or more of the following features. A distribution plan is identified for each electronic document. The distribution plan defines the set of parameters that correspond to a particular data repository, and the set of parameters is mutually exclusive with respect to other distribution plans. A search request identifying one or more search parameters is received, and a subset of the plurality of data repositories storing document types that potentially include the one or more search parameters is identified based on an intersection between document types that include the one or more search parameters and document types that include the set of parameters corresponding to each of the plurality of data repositories. A search is conducted for electronic documents that satisfy the search request in the subset of the plurality of data repositories.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
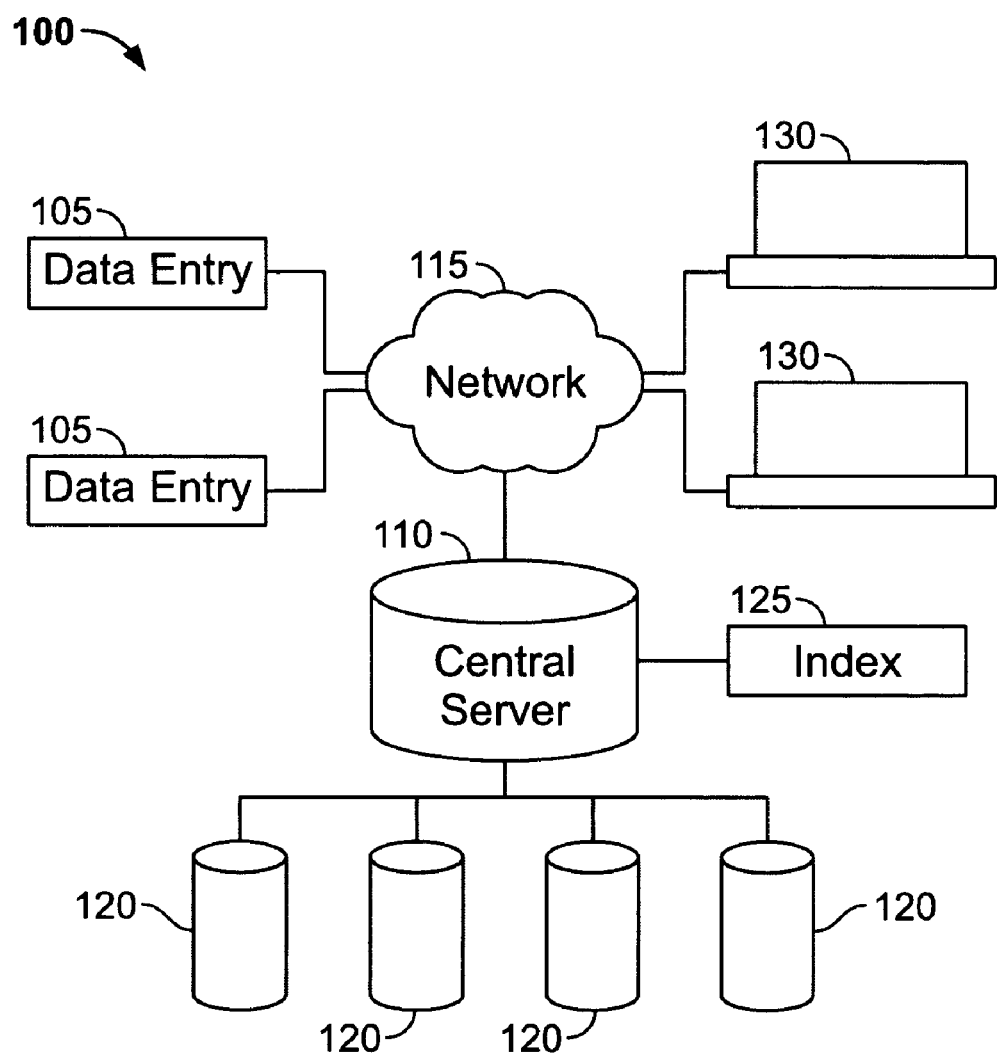
FIG. 1 is a block diagram of a data storage system.

FIG. 1 is a block diagram of a data storage system 100. Data is entered at a data entry device 105, which can be a workstation, a personal computer, or an imaging device, for example. In a representative implementation, images of documents are obtained using an imaging device, such as a scanner. Other metadata relating to the documents can also be entered through a user interface, such as by manually keying data or using OCR techniques from a scanned document. Document data can be entered at multiple different data entry devices 105, which can be situated in a single location or distributed across a wide geographical area. Document images and other document data are routed to a central server 110 through a network 115, such as a local area network (LAN), wide area network (WAN), or the Internet.

The document images and other document data for a particular physical document can separately or collectively constitute an electronic document. For purposes of this description, an electronic document does not necessarily correspond to a file. A document may be stored in a portion of a file that holds other documents, in a single file dedicated to the document in question, or in multiple coordinated files. Electronic documents can include but are not limited to digital images of physical (e.g., paper) documents, sets of data keyed into a user interface and stored, e.g., as one or more XML files, submissions of a completed form on a web page, and other associated groups of data entries. An electronic document does not need to be in an image format but can be stored, for example, as an XML document, a flat file, a data set, or a data record. Generally, an electronic document includes data content in defined data fields. An electronic document can include, collectively, a document image and a set of data relating to the document image. The document image may be stored as an attachment, while the set of data is stored as indexing data. For example, the set of data can include multiple data fields (e.g., a name field, a date field, a document type field, etc.) that contain data content (e.g., name, date, document type, etc.) stored in coded format (e.g., ASCII). The data content can be manually read from an original document or a document image and keyed into appropriate data fields by data entry personnel. Alternatively, the data content can be automatically read from the document image using an OCR process and entered into appropriate data fields based on a location of the data on the document image, such as when the location of data fields on a form is known.

The central server 110 includes logic for selecting one of multiple data repositories 120 in which to store each received electronic document. In particular, storage of electronic documents is segmented across multiple logical storage locations, such as directories, databases, and/or servers, based on data fields associated with the various electronic documents. In other words, one or more data fields for each electronic document are analyzed to determine in which data repository 120 the electronic document is to be stored. The logic that performs the segmentation function is a distribution plan. Each distribution plan defines how one or more document types are distributed among the repositories 120.

Typically, the data fields that are used for purposes of segmenting electronic documents are user-defined fields (i.e., having user-defined data content). In general, electronic documents that share certain characteristics are stored in the same logical location and the electronic documents are indexed according to those certain characteristics. A single logical location, however, can include multiple different (and potentially unrelated) document types. For example, a particular logical storage location may store invoice documents that have a purely numeric invoice number within a particular range of numbers. As a result, the particular logical storage location may store medical invoices from one company and office supply invoices from another company.

To segment electronic documents, data types and/or data content within the data fields can also be used to determine to which grouping or logical location each particular electronic document is assigned. "Data type" generally refers to the format, such as Boolean, alphanumeric, a date format, a restricted sequence of characters, etc., that is defined for a data field, while data content is the actual user-defined data (e.g., name, date, address, etc.) contained within a data field. The parameters that are used to segment data are generally mutually exclusive. In other words, a particular document will match only one grouping or logical location.

For example, electronic documents that contain invoice data may include a data field that specifies an invoice number. Invoices for a medical company may use invoice numbers made up of alphanumeric characters, while invoices for a clothing company may use invoice numbers made up of numerals only. Electronic documents may be segmented between different logical storage locations based on whether they include a data field for an invoice number and what the data type is for the invoice number data field (i.e., whether the invoice number is alphanumeric or contains numerals only). Any number of data fields and data types can be defined among the various possible electronic documents and/or for purposes of segmenting electronic documents. In some cases, data content can be used to segment electronic documents. For example, certain electronic documents may have a data field for a last name. The central server 110 may segment electronic documents based on the first letter of the last name. Accordingly, electronic documents having a last name field containing a last name that begins with the letter B may be stored in a data repository that differs from electronic documents having a last name field containing a last name that begins with the letter M.

The data repositories 120 correspond to different logical storage locations and can also be different physical storage media, such as different DVDs, hard drives, and/or tapes. In segmenting the electronic documents, indexing data can be stored separately from attachments. Thus, the indexing data that relates to a particular document image may be stored in one logical storage location, while the attachments that contain the particular document image are stored in another logical storage location.

To segment electronic documents among the data repositories 120, the central server 110 includes an index 125 that defines how electronic documents are distributed among the different data repositories 120. When an electronic document is received by the central server 110 from the data entry devices 105, the central server 110 uses the index 125 to identify the data repository 120 in which to store the received electronic document. The index 125 can have any of a number of different formats. For example, the index 125 can be in the form of a table, a database, a software module, an XML document, and the like. The electronic documents 120 within each data repository 120 can be organized in different ways, such as by date and time of storage, according to the data used to segment the various electronic documents, and/or in a database of records. Indexing data for an electronic document can also be organized in a different manner than the attachments for the same electronic document. For example, the indexing data may be organized in a database (e.g., a SQL server) according to the data used to segment the various electronic documents, while the attachments are organized in a directory hierarchy that may contain folders, sub-folders, sub-sub-folders, etc. according to when the attachments were stored.

Electronic documents in the repositories 120 can be accessed through user interfaces on client devices 130. In particular, a user with appropriate security authorization can access the central server 110 through the network 115 from a client device 130. The user can perform searches by entering search criteria into a search form displayed on the user interface. The search form can vary, such as by providing different data fields for entering search criteria, depending on the type of document to search for, the role of the user, whether a basic or advanced search is to be performed, etc.

The central server 110 uses the search criteria received through the search form in addition to the data stored in the index 125 to identify which data repositories 120 might store the desired electronic documents. For example, the index 125 can include information defining the data fields included within each document type. In addition, the index 125 can include information defining possible data types and/or data content for each data field of the various document types. Such information can be stored in tables or in any other form. The central server 110 correlates or looks for intersections between the data fields, data types, and/or data content of the search criteria and the data fields, permissible data types, and/or permissible data content for different document types to identify the possible document types to which the search can pertain. The document types that can be stored in each repository 120 are also known by the central server 110 based on the parameters used to segment the documents. By correlating or looking for intersections between the possible document types to which a search can pertain and the document types that can be stored in the various different repositories 120, the central server 110 can identify which repositories 120 should be searched in response to a search request. For example, if a particular repository 120 stores documents based on the contents of an applicant name data field and a search request is received for documents with loan amounts that are greater than eighty five percent of the property value, the central server 110 knows that the search is for loan applications and that loan application documents may be stored in the particular repository 120. Thus, the central server 110 includes the particular repository 120 as one of the repositories 120 that are searched in response to the search request.

Using this technique, various different types of electronic documents (i.e., from different applications) can be stored in the same set of repositories 120. Repositories 120 can be added at a later time and the segmentation criteria can change over time, and the central server 110 can maintain knowledge of which repositories 120 store documents that meet certain criteria. In addition, the central server 110 need not know the type of search that is being performed. Instead, the central server 110 can use knowledge about the document types that are stored in the various repositories 120 and the particular search criteria to identify which repositories 120 are to be searched.

In some implementations, electronic documents are segmented using parameters (e.g., data fields, data content, etc) that correspond to the criteria that are likely to be used to search for the documents. For example, if health care insurance documents are typically searched for by the patient's social security number, such documents may be segmented according to the patients' social security numbers (e.g., social security numbers for which the first three digits are in the range of 544-578 may be stored in one repository while those in the range of 579-593 may be stored in another repository). Furthermore, the electronic documents can be indexed within each repository based on the parameters used to segment the documents. In other implementations, electronic documents are segmented using a first set of data parameters and are indexed using a second set of data parameters that differs from the first set. The second set of data parameters can be different by including some overlapping parameters with the first set or can be different by being mutually exclusive with the first set.

Figure 2:
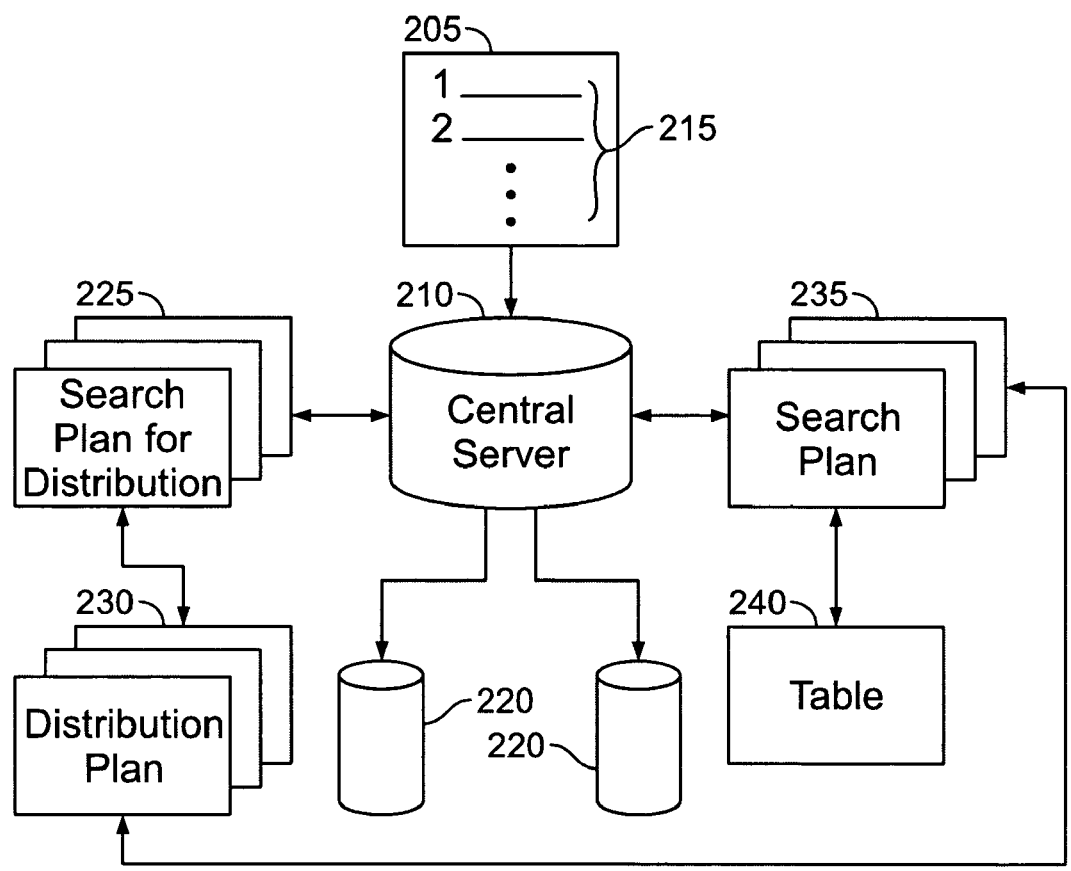
FIG. 2 is a block diagram illustrating one implementation of the distribution and searching techniques of the invention.

FIG. 2 is a block diagram illustrating one implementation of the distribution and searching techniques of the invention. An electronic document 205 is received at a central server 210. The electronic document includes various user-defined data fields 215 that contain data content, typically in a specified data format. In addition, the electronic document 205 may include one or more attachments, which include an image of a physical document. The central server 210 stores the electronic document in a particular one of multiple available repositories 220, although, as discussed above, indexing data for the electronic document 205 can be stored in a different repository 220 than the attachments.

The central server 210 can distribute electronic documents 205 using an indexing mechanism that includes multiple search plans for distribution 225. The search plans for distribution 225 include one or more empty data fields that are selected according to the document types to which the search plan for distribution is intended to apply. Each search plan for distribution 225 is a search plan similar to a search plan that a user could use to perform a search for documents except that the search plan is reserved for use in distribution of electronic documents 205. When an electronic document 205 is received by the central server 210, the central server 210 searches for a search plan for distribution 225 that includes data fields that intersect with or match at least a subset of the data fields found in the electronic document 205. In general, the search plans for distribution 225 are mutually exclusive in that electronic documents 205 will not match more than one search plan for distribution 225.

Once a search plan for distribution 225 is identified, a distribution plan 230 is identified. While the search plans for distribution 225 provide a structure for determining which repository 220 to send an electronic document 205 to, the distribution plans 230 provide underlying data for determining which repository 220 stores a particular document type. For example, the distribution plans 230 can specify to which repository 220 an electronic document 225 is to be sent based on data within one or more data fields identified in the search plan for distribution 225 and included in the electronic document 205. Generally, the distribution plans 230 define how electronic documents 205 are segmented among the repositories 220. Each search plan for distribution 225/distribution plan 230 pair is mutually exclusive with respect to other search plan for distribution 225/distribution plan 230 pairs. Thus, each electronic document 205 matches only one search plan for distribution 225/distribution plan 230 pair. Although search plans for distribution 225 are described as being a separate component from the distribution plans 230, for purposes of this description the overall combination of a search plan for distribution 225 and one of the illustrated distribution plans 230 can be referred to as a distribution plan.

Subsequently, when a user desires to perform a search for documents, the user selects a search plan 235 and enters search criteria for one or more of the data fields included in the search plan 235. The user may select among multiple search plans 235 available through the central server 210. Each search plan 235, for example, may correspond to a different document type to be searched. Each search plan 235 may therefore include data fields that correspond to the data fields for the corresponding document type. Users can enter search criteria into the available data fields. When the search criteria are received by the central server 210, the central server 210 accesses data defining where different document types are stored. This data may be contained in a table 240 that describes a location or locations associated with each document type. Alternatively, this data may be obtained by accessing data contained in the distribution plans 230.

Figure 3:
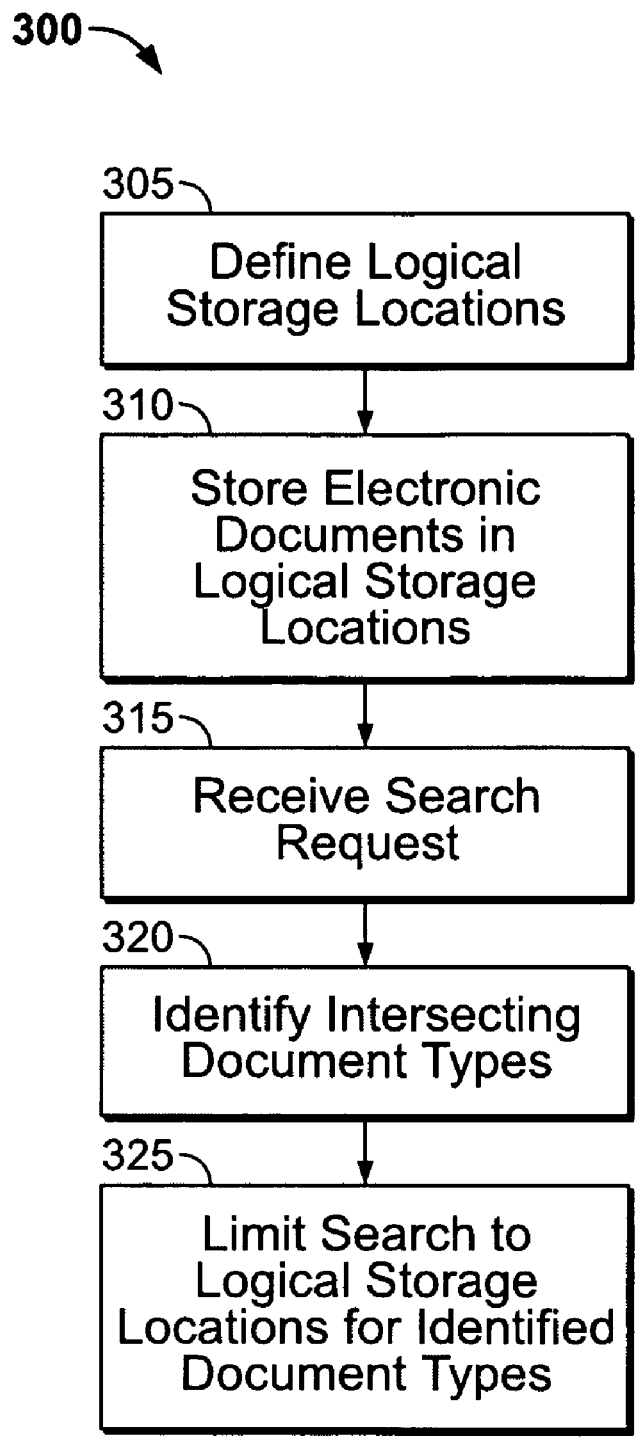
FIG. 3 is a flow diagram of a process for storing electronic documents.

FIG. 3 is a flow diagram of a process 300 for storing electronic documents. Multiple logical storage locations are defined (step 305). Each logical storage location corresponds to a first set of data parameters. For example, a particular logical storage location may be used for storing electronic documents that include certain data fields and certain data types and/or data content within the data fields.

Electronic documents are stored in the multiple logical storage locations (step 310). Each electronic document is stored in a logical storage location corresponding to a first set of data parameters that are also found in the electronic document. Which of the multiple logical storage location each electronic document is stored in is determined by one or more distribution plans that define how to segment the electronic documents into logical groupings. For example, if a particular logical storage location corresponds to documents having an applicant last name data field that contains last names that start with the letter D, electronic documents that include an applicant last name data field that contains a last name starting with the letter D are stored in the particular logical storage location.

To perform the segmentation, for example, when a document is to be stored, a search is conducted for a search plan for distribution having criteria (e.g., data fields and possibly data types) that match/intersect with the document data. In other words, each document type has a defined set of data fields. Each search plan also includes one or more data fields. By finding a search plan for which the one or more data fields are included in the defined set of data fields, a search plan that matches a particular document can be located. Once a search plan for distribution is identified, the document data can be further segmented, in accordance with a distribution plan, based on content of a data field. The document data is then sent to a corresponding logical storage location.

To determine which search plan for distribution matches a particular document, data need not necessarily be present in the document. In other words, the mere presence of particular data fields can be used to determine the type of document and thus the proper search plan for distribution. For example, a document type A has fields FirstName and LastName, and a document type B has data fields FirstName, LastName, and SSN. Any document that has FirstName, LastName, and SSN data fields will match the search plan for document type B, even if all of the fields are blank (i.e., contain no data). Similarly, a document containing the data fields FirstName and LastName but not SSN will match document type A even if none of the data fields contains data.

The electronic document is indexed within the logical storage location based on a second set of data parameters, which can be the same as or different than the first set of data parameters. In cases where the second set of data parameters are different, the second set of data parameters can be a subset of the first set of data parameters or the first set of data parameters can be a subset of the second set of data parameters. Each logical storage location can store electronic documents of one or more document types. Document types can be defined by general categories of document (e.g., checks, insurance claim forms, medical invoices, etc.) or by the collection of data fields, data types, and/or data content included in a document. Each document type stored in a particular logical storage location will have a corresponding set of data parameters (i.e., a collection of specific data fields, data types, and/or data content) that includes the first and second sets of data parameters.

A search request that includes one or more search parameters is received (step 315). Document types that include data parameters that intersect the one or more search parameters are identified (step 320), and a search that is performed in response to the search request is limited to the logical storage locations that store electronic documents of the identified document types (step 325). For example, when a search is conducted (i.e., by searching for particular content in a data field), the data field or fields identified in the search request are correlated with the data fields of different document types to identify which document types could potentially satisfy the search criteria. The locations that store document data for the identified document types are then searched to find documents that meet the search criteria. This allows the search to be conducted on only a small part of the overall system because most logical storage locations can be ruled out based on a lack of intersection between the search criteria and most document types. The number of locations searched can be further reduced by taking into account the most common search criteria when designing the distribution plan. If documents are segmented according to the same criteria in which they are likely to be searched, the number of locations searched can be reduced.

The described techniques are scalable. For example, electronic documents can be segmented based on geographical considerations (e.g., if the electronic document corresponds to a check for a particular bank customer, the check may be sent to a logical storage location that is located physically near the bank customer's primary banking location, rather than in a location across the country). This allows documents to be retrieved in a more efficient manner. In addition, electronic documents can be segmented among different logical storage locations based on dates associated with the documents.

If a particular logical storage location is approaching capacity at too quickly of a rate, or if it is too slow because of a high storage load, the load can be split between different logical storage locations. For example, if a particular logical storage location is associated with electronic documents having a name in a data field that begins with the letter C and the particular logical storage location is too slow in storing and retrieving data, the load for the particular logical storage location can be split between two (or more) logical storage locations (e.g., one associated with names in the data field that begin with Ca-Ch and another with names in the data field that begin with Ci-Cz). By storing data defining historical distribution plans, changes to how documents are segmented among the different logical storage locations can be accounted for by the server that controls the search process. As a result, a search for a particular document type may be performed on multiple different logical storage locations based on a change over time of where documents of the particular type are stored. In some cases, the search may be performed first on only part of the logical storage locations (e.g., the most recent location to which documents of the particular type are stored) and performed on additional logical storage locations only if the desired document is not located.

The described techniques can also be used for managing the lifecycle of documents. Over time, documents are copied, moved, archived and purged. The segmentation provided by the search/distribution plans can be used to make this chore considerably easier (on an even larger scale than searching because typically all documents go through these lifecycle stages and not all documents are retrieved using searches).

The described techniques can be implemented in digital electronic circuitry, integrated circuitry, or in computer hardware, firmware, software, or in combinations thereof. Apparatus for carrying out the techniques can be implemented in a software product (e.g., a computer program product) tangibly embodied in a machine-readable storage device for execution by a programmable processor; and processing operations can be performed by a programmable processor executing a program of instructions to perform the described functions by operating on input data and generating output. The techniques can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the techniques can be implemented on a computer system having a display device such as a monitor or LCD (liquid crystal display) screen for displaying information to the user and a keyboard and a pointing device such as a mouse or a trackball by which the user can provide input to the computer system or a system which enables input and presents information via voice, symbols, or other means such as a Braille input and output system. The computer system can be programmed to provide a graphical user interface through which computer programs interact with users. With new technologies such as voice input and output, it is not a requirement to have a visual display to implement the described techniques.

The invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 4:
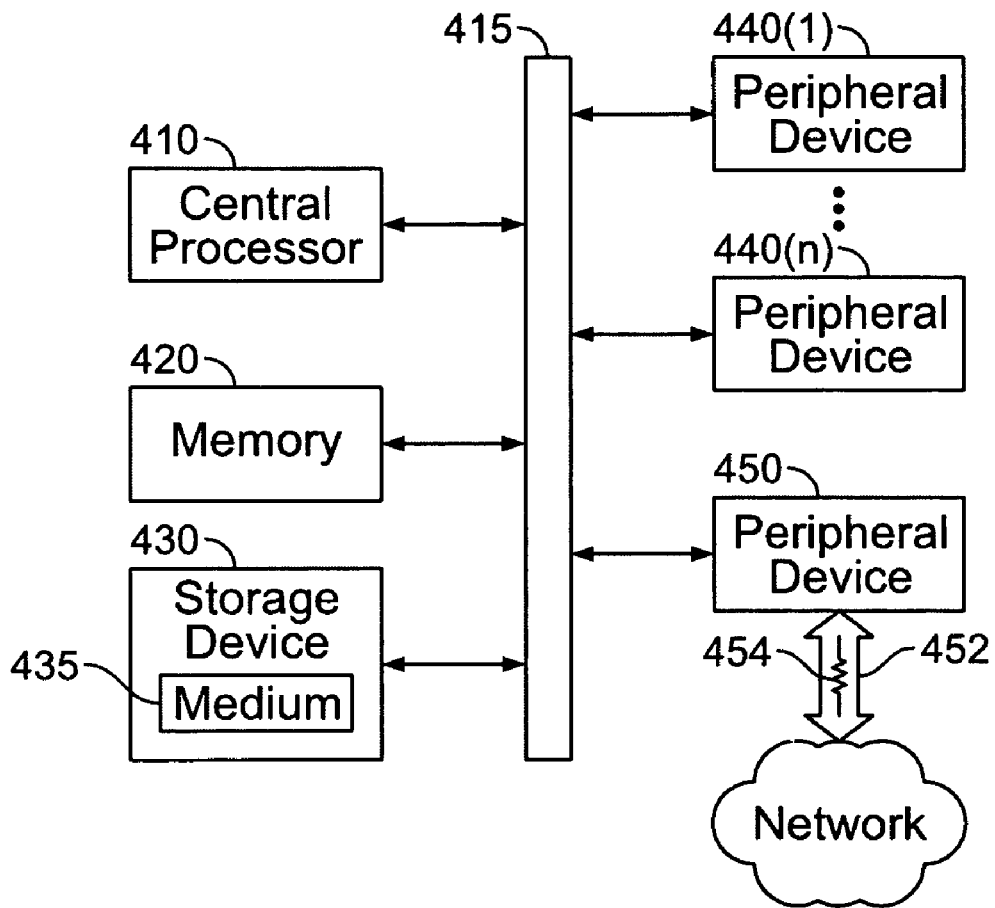
FIG. 4 is a block diagram illustrating an example data processing system in which a system for storing electronic documents can be implemented.

FIG. 4 is a block diagram illustrating an example data processing system 400 in which a system for storing electronic documents can be implemented. The data processing system 400 includes a central processor 410, which executes programs, performs data manipulations, and controls tasks in the system 400. The central processor 410 is coupled with a bus 415 that can include multiple busses, which may be parallel and/or serial busses.

The data processing system 400 includes a memory 420, which can be volatile and/or non-volatile memory, and is coupled with the communications bus 415. The system 400 can also include one or more cache memories. The data processing system 400 can include a storage device 430 for accessing a storage medium 435, which may be removable, read-only, or read/write media and may be magnetic-based, optical-based, semiconductor-based media, or a combination of these. The data processing system 400 can also include one or more peripheral devices 440(1)-440(n) (collectively, devices 440), and one or more controllers and/or adapters for providing interface functions.

The system 400 can further include a communication interface 450, which allows software and data to be transferred, in the form of signals 454 over a channel 452, between the system 400 and external devices, networks, or information sources. The signals 454 can embody instructions for causing the system 400 to perform operations. The system 400 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 400 and/or delivered to the machine 400 over a communication interface. These instructions, when executed, enable the machine 400 to perform the features and function described above. These instructions represent controllers of the machine 400 and can be implemented in a high-level procedural and/or object-oriented programming language, and/or in assembly/machine language. Such languages can be compiled and/or interpreted languages.

As used herein, the term "machine-readable medium" refers to any computer program product, apparatus, and/or device used to provide machine instructions and/or data to the machine 400, including a machine-readable medium that receives machine instructions as a machine-readable signal. Examples of a machine-readable medium include the storage medium 435, the memory 420, and/or PLDs, FPGAs, ASICs, and the like.

A number of implementations have been described. Nevertheless, it will be understood that various modifications may be made. Accordingly, other implementations are within the scope of the following claims.

What is claimed is:

1. A method for storing electronic documents, the method comprising:
   defining a plurality of logical storage locations, with each logical storage location corresponding to a predetermined first set of criteria defining one or more data parameters of electronic documents to be stored in the particular logical storage location;
   storing electronic documents in the plurality of logical storage locations, wherein each electronic document is stored in a particular logical storage location having a particular corresponding predetermined first set of criteria based on a particular corresponding first set of data parameters associated with the electronic document, and the electronic document is indexed within the logical storage location based on a second set of data parameters associated with the electronic document; and
   dynamically modifying the predetermined first set of criteria corresponding to the particular logical storage location after storing one or more electronic documents by segmenting the predetermined first set of criteria into at least a first subset of the predetermined first set of criteria and a second subset of the predetermined first set of criteria, wherein the first subset of the predetermined first set of criteria corresponds to the particular logical storage location and the second subset of the predetermined first set of criteria corresponds to at least one other logical storage location.

2. The method of claim 1 wherein each logical storage location stores electronic documents of at least one document type, with each document type for the logical storage location having a third set of data parameters that includes the particular corresponding predetermined first set of criteria.

3. The method of claim 2 further comprising:
   receiving a search request including at least one search parameter;
   identifying document types having third sets of data parameters that intersect the at least one search parameter; and
   limiting a search based on the received search request to one or more logical storage locations storing electronic documents of the identified document types.

4. The method of claim 3 wherein the search request includes at least one of the first set of data parameters or the second set of data parameters, and wherein the search request selected based on knowledge of parameters likely to be used to search for electronic documents having a particular document type.

5. The method of claim 1 further comprising segmenting the electronic documents into logical groupings using distribution plans that each correspond to the predetermined first set of criteria for a particular logical storage location.

6. The method of claim 5 wherein segmenting the electronic documents comprises:
   identifying, for each electronic document, a search plan having criteria that match data field parameters associated with the electronic document; and
   identifying a distribution plan for the identified search plan, wherein the identified distribution plan includes a predetermined first set of criteria that match data content parameters associated with the electronic document.

7. The method of claim 6 wherein each pair of a search plan and a distribution plan is mutually exclusive with respect to other pairs of search plans and distribution plans.

8. The method of claim 1 wherein the predetermined first set of criteria corresponding to each logical storage location is mutually exclusive with respect to the predetermined first set of criteria for others of the plurality of logical storage locations.

9. The method of claim 1 wherein each electronic document comprises a set of index data and a set of attachments.

10. The method of claim 9 wherein the set of index data and the set of attachments are stored in different logical storage locations for each electronic document.

11. The method of claim 1 wherein the first set of data parameters and the second set of data parameters are the same and include at least one parameter selected from the group consisting of data fields, data types, and data content.

12. The method of claim 1 wherein the first set of data parameters and the second set of data parameters are different and each include parameters selected from the group consisting of data fields, data types, and data content.

13. The method of claim 1 wherein the logical storage locations correspond to physical storage locations.

14. The method of claim 1 wherein each logical storage location corresponds to a directory in a computer storage system.

15. An article comprising a machine-readable medium storing instructions for causing one or more processors to perform operations comprising:
   receiving a plurality of electronic documents to be stored;
   identifying a selected logical storage location for storing a particular one of the plurality of electronic documents, wherein the selected logical storage location is selected from among a plurality of logical storage locations, with each logical storage location having a corresponding predetermined set of criteria associated with one or more parameters of the plurality of electronic documents, and the predetermined set of criteria for the selected logical storage location matches parameters defined in the particular one of the plurality of electronic documents;
   storing the particular one of the plurality of electronic documents in the selected logical storage location, and
   dynamically modifying the predetermined set of criteria corresponding to the selected logical storage location after storing the particular one of the plurality of electronic documents by segmenting the predetermined set of criteria into at least a first subset of the predetermined set of criteria and a second subset of the predetermined set of criteria, wherein the first subset of the predetermined set of criteria corresponds to the selected logical storage location and the second subset of the predetermined set of criteria corresponds to at least one other logical storage location among the plurality of logical storage locations.

16. The article of claim 15 wherein:
the particular one of the plurality of electronic documents comprises indexing data and at least one attachment;
identifying a selected logical storage location comprises identifying a first selected logical storage location for the indexing data and identifying a second selected logical storage location for the at least one attachment; and
storing the particular one of the plurality of electronic documents comprises storing the indexing data in the first selected logical storage location and storing the at least one attachment in the second selected logical storage location.

17. The article of claim 15 wherein each logical storage location stores electronic documents of at least one document type, with each document type comprising a set of parameters that includes the corresponding set of predetermined criteria for the logical storage location, with the machine-readable medium storing instructions for causing one or more processors to perform further operations comprising:
receiving a search request identifying at least one search parameter;
identifying document types having sets of parameters that include the at least one search parameter; and
limiting a search performed in response to the received search request to logical storage locations that store the identified document types.

18. The article of claim 15 wherein the corresponding predetermined set of criteria for each logical storage location is mutually exclusive with respect to the corresponding predetermined set of criteria for other logical storage locations.

19. The article of claim 15 wherein identifying a selected logical storage location for storing the electronic document comprises:
identifying a distribution plan that matches data field parameters defined in the electronic document; and
using the identified distribution plan and data content parameters defined in the electronic document to identify the selected logical storage location.

20. A document storage system comprising:
a plurality of data repositories; and
a server operable to store electronic documents in the plurality of data repositories, wherein the server is further operable to:
identify one of the plurality of data repositories for storing each electronic document, wherein each data repository corresponds to a predetermined set of criteria, the predetermined set of criteria defining one or more parameters of the electronic documents to be stored in the particular data repository, and wherein the identified data repository for each electronic document is selected based on the predetermined set of criteria corresponding to the identified data repository; and
dynamically modify the predetermined set of criteria corresponding to the identified data repository after storing one or more electronic documents by segmenting the predetermined set of criteria into at least a first subset of the predetermined set of criteria and a second subset of the predetermined set of criteria, wherein the first subset of the predetermined set of criteria corresponds to the identified data repository and the second subset of the predetermined set of criteria corresponds to at least one other data repository.

21. The system of claim 20 wherein the one or more parameters associated with the predetermined set of criteria are selected from the group consisting of data fields, data types, and data content.

22. The system of claim 20 wherein the server is further operable to:
identify a distribution plan for each electronic document, with the distribution plan defining the predetermined set of criteria that correspond to a particular data repository, wherein the predetermined set of criteria is mutually exclusive with respect to other distribution plans.

23. The system of claim 20 wherein the server is further operable to:
receive a search request identifying at least one search parameter;
identify a subset of the plurality of data repositories storing document types that potentially include the at least one search parameter, wherein the subset is identified based on an intersection between document types that include the at least one search parameter and document types that include the predetermined set of criteria corresponding to each of the plurality of data repositories; and
search for electronic documents that satisfy the search request in the subset of the plurality of data repositories.

24. The method of claim 1 wherein the predetermined first set of criteria corresponding to the particular logical storage location is dynamically modified based on one of the following: increased data access times for electronic documents stored in the particular logical storage location or limited storage capacity in the particular logical storage location.

25. The article of claim 15 wherein the predetermined set of criteria corresponding to the selected logical storage location is dynamically modified based on one of the following: increased data access times for electronic documents stored in the selected logical storage location or limited storage capacity in the selected logical storage location.

26. The system of claim 20 wherein the predetermined set of criteria corresponding to the identified data repository is dynamically modified based on one of the following: increased data access times for electronic documents stored in the identified data repository or limited storage capacity in the identified data repository.

* * * * *